(12) United States Patent
Gibbs et al.

(10) Patent No.: US 9,146,666 B2
(45) Date of Patent: Sep. 29, 2015

(54) TOUCH SENSOR NAVIGATION

(75) Inventors: Benjamin K. Gibbs, Camas, WA (US); William Phillip Hough, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 432 days.

(21) Appl. No.: 13/529,597

(22) Filed: Jun. 21, 2012

(65) Prior Publication Data

US 2013/0342581 A1    Dec. 26, 2013

(51) Int. Cl.
G09G 5/00 (2006.01)
G06F 3/041 (2006.01)
G06F 3/0488 (2013.01)
G09G 5/34 (2006.01)

(52) U.S. Cl.
CPC .............. *G06F 3/0488* (2013.01); *G09G 5/346* (2013.01); *G09G 2340/045* (2013.01); *G09G 2340/0407* (2013.01); *G09G 2370/027* (2013.01)

(58) Field of Classification Search
CPC . G06F 3/0485; G06F 1/1626; G06F 3/04855; G06F 3/0481; G06F 3/0486; G09G 5/346; G09G 5/14; G09G 2340/0407; G09G 2340/0414; G09G 2340/0421; G06T 3/40

USPC .................. 345/173, 660–661, 665, 667, 684
See application file for complete search history.

(56) References Cited

U.S. PATENT DOCUMENTS

| | | | |
|---|---|---|---|
| 6,690,387 B2 | 2/2004 | Zimmerman et al. | |
| 7,469,381 B2 | 12/2008 | Ording | |
| 7,479,949 B2 | 1/2009 | Jobs et al. | |
| 7,515,142 B2 | 4/2009 | Park | |
| 8,009,146 B2 | 8/2011 | Pihlaja | |
| 2009/0187375 A1* | 7/2009 | Kinoshita et al. | 702/158 |
| 2009/0265658 A1* | 10/2009 | Klishko et al. | 715/786 |
| 2010/0031186 A1* | 2/2010 | Tseng et al. | 715/786 |
| 2010/0123669 A1* | 5/2010 | Chae et al. | 345/173 |
| 2011/0080430 A1* | 4/2011 | Nishibe et al. | 345/661 |
| 2011/0211122 A1* | 9/2011 | Sullivan | 348/581 |

* cited by examiner

*Primary Examiner* — Todd Buttram
(74) *Attorney, Agent, or Firm* — Austin Rapp & Hardman

(57) ABSTRACT

A method for image navigation on an electronic device is described. The method includes displaying an image. The method also includes detecting at least one contact with a touch sensor to obtain a first position. The method further includes obtaining an updated position corresponding to a contact movement. The method additionally includes determining a modified position by applying at least one scaling function based on the first position and the updated position. The method also includes moving the image based on the modified position.

20 Claims, 11 Drawing Sheets

TOUCH SENSOR NAVIGATION

TECHNICAL FIELD

The present disclosure relates generally to electronic devices. More specifically, the present disclosure relates to touch sensor navigation.

BACKGROUND

The use of electronic devices has become commonplace in modern society. Electronic devices have become smaller and more powerful in order to meet consumer needs and to improve portability and convenience. Electronic devices that are commonly used include computing devices, such as personal computers or laptops. Other electronic devices commonly used include cellular phones, smart phones, Personal Digital Assistants, tablet devices, netbooks, e-readers, Global Positioning Satellite (GPS) units, etc. Consumers have become dependent upon electronic devices and have come to expect increased functionality.

As electronic devices have advanced, several kinds of interfaces that allow humans to interact with electronic devices have been used. For example, personal computers often use keyboards and mice for interaction. However, other interfaces for interacting with electronic devices have also been presented and adopted by many. For example, touchscreens and touchpads are now commonly used. Touchscreens and touchpads provide an interface whereby a user can physically touch a touchscreen or a touchpad in order to interact with electronic devices. However, known touch or contact interaction may not accurately correspond with the user's intended interaction. As can be seen from this discussion, systems and methods that improve electronic device interaction may be beneficial.

DETAILED DESCRIPTION

Figure 1:
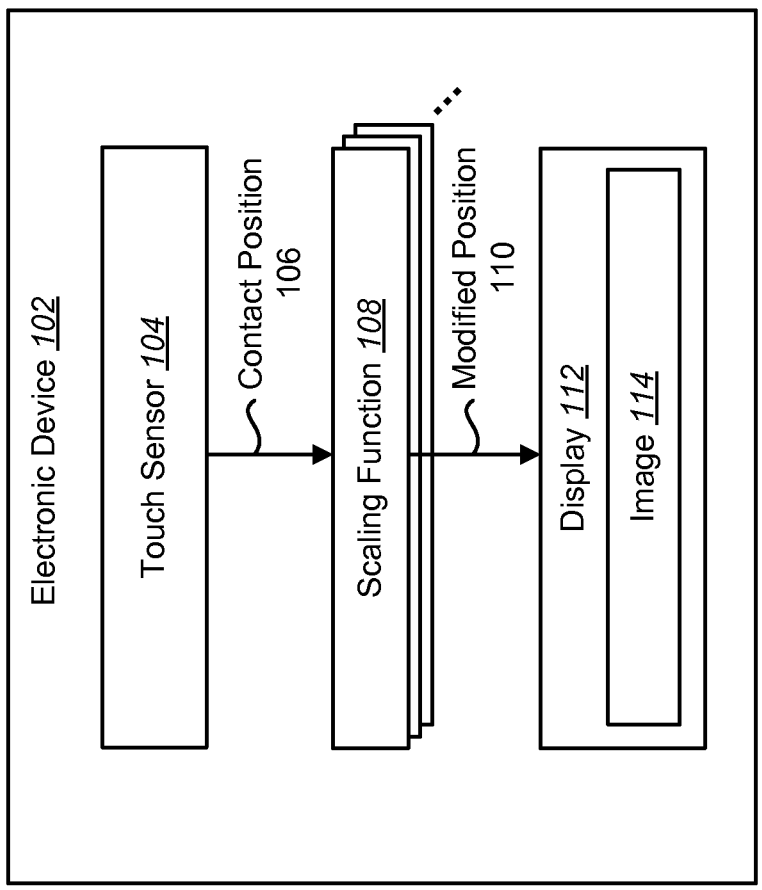
FIG. 1 is a block diagram illustrating one configuration of an electronic device on which systems and methods for touch sensor navigation may be implemented.

A method for image navigation on an electronic device is described. The method includes displaying an image. The method also includes detecting at least one contact with a touch sensor to obtain a first position. The method further includes obtaining an updated position corresponding to a contact movement. The method additionally includes determining a modified position by applying at least one scaling function based on the first position and the updated position. The method also includes moving the image based on the modified position.

Determining the modified position may include determining a modified vertical distance by applying a first scaling function. Determining the modified position may also include determining a modified horizontal distance by applying a second scaling function. Determining the modified position may further include determining the modified position based on the modified vertical distance and the modified horizontal distance. The second scaling function may be a shifted inverse of the first scaling function.

Determining the modified vertical distance and the modified horizontal distance may include determining a vertical distance and a horizontal distance. Determining the modified vertical distance and the modified horizontal distance may also include determining the modified vertical distance by applying a first scaling function based on the vertical distance and the horizontal distance. Determining the modified vertical distance and the modified horizontal distance may further include determining the modified horizontal distance by applying a second scaling function based on the vertical distance and the horizontal distance.

Determining the modified position may include determining a vertical distance and a horizontal distance based on the first position and the updated position. Determining the modified position may also include determining a movement angle based on the vertical distance and the horizontal distance. Determining the modified position may further include determining a vertical scaling factor based on a first scaling function and the movement angle. Determining the modified position may additionally include determining a horizontal scaling factor based on a second scaling function and the movement angle. Determining the modified position may also include determining a modified vertical distance based on the vertical scaling factor and the vertical distance. Determining the modified position may further include determining a modified horizontal distance based on the horizontal scaling factor and the horizontal distance. Determining the modified position may additionally include determining the modified position based on the modified vertical distance and the modified horizontal distance.

The method may also include determining at least one subsequent modified position based on a subsequent contact movement during continuous contact with the touch sensor. The at least one subsequent modified position may not be constrained to a single direction.

The at least one scaling function may be at least one of a group consisting of a continuous function, a step function and a lookup table. The image may be selected from a group consisting of a web page, an electronic document and a digital photograph. The touch sensor and a display may comprise a touchscreen display. The modified position may be based on a polar coordinate system or a Cartesian coordinate system.

An electronic device that is configured for image navigation is also disclosed. The electronic device includes a display, a touch sensor, a processor, memory in electronic communication with the processor and instructions stored in the memory. The electronic device detects at least one contact with the touch sensor to obtain a first position. The electronic device obtains an updated position corresponding to a contact movement. The electronic device determines a modified position by applying at least one scaling function based on the first position and the updated position. The electronic device also moves the image based on the modified position.

The systems and methods disclosed herein provide a solution for touch sensor navigation. For example, the systems and methods disclosed herein may be used for two dimensional touchscreen scrolling. Electronic images (e.g., web pages) usually contain text and may be designed to be read rather than just viewed. Text may be written in horizontal and vertical blocks. When a web page is viewed on a mobile electronic device, a level of zoom may be such that only a portion of the web page is visible. This may require a user to scroll around the web page as the user reads it. For example, the scrolling movement may be accomplished on a touchscreen by the user swiping the screen.

When a contact is moved along a touchscreen, the contact's position on the touchscreen may be reported regularly by a touchscreen driver as a set of coordinates. The movement of the contact may be determined from the difference between the latest horizontal and vertical position detected and the previous position. In a traditional screen scrolling system, the screen is moved by the amount that the contact has moved.

Desirable scrolling movement may often be horizontal or vertical. However, undesirable scrolling occurs when the user wants the document to scroll vertically or horizontally, but the document moves away from these axes. This may be due to their contact movement not being completely horizontal or vertical. Accordingly, the document may appear to drift away from the desired vertical or horizontal scrolling.

For example, a full web site may be downloaded to a mobile device, but due to the size of the screen, only a small portion may be viewed comfortably. As the user finishes reading this part of the page, they may scroll using their finger, but the angle of their swiping may not be completely vertical. If the exact contact movement is taken and used for scrolling, the end result may be that the screen appears to drift to an unexpected location. However, when the disclosed systems and methods are used, the scrolling movement may more closely conform to the user's intent.

The problem of scrolling drift occurs in a known approach to touch sensor navigation. The scrolling directly follows the actual contact movement. As such, the scrolling experience suffers from appearing to drift away from the desired location.

A known approach to address this problem is to detect the contact movement at the start of a scrolling motion, determine if it is a horizontal or vertical movement and then lock the scrolling from then on into that direction. This means that if the user starts a vertical scroll at the start of their contact movement on the screen, the screen will only scroll up and down during the contact, even if the contact direction changes later on. Accordingly, this approach may be inflexible in that it only allows two axes of movement.

In some configurations, the systems and methods disclosed herein address the problem of two dimensional touchscreen scrolling. One or more of the horizontal and vertical components may be modified by a scaling function to alter the scrolling movement of the display. In one configuration, one scaling function may be applied to the vertical component and another scaling function may be applied to the horizontal component. In another configuration, one scaling function may be applied to the vertical component and the inverse may be applied to the horizontal component.

The systems and methods disclosed herein may be beneficial to alleviate some of the problems of two dimensional touchscreen scrolling. For example, one benefit is reduction of the "scrolling drift" problem. Another benefit is the possibility to change scrolling direction without lifting the contact from the touch sensor. For example, the systems and methods disclosed herein may favor navigation along an axis while allowing a switch to another axis without lifting the contact. Undesirable contact movement may be continuously reduced so long as the contact is touching the touch sensor. Another benefit is that no comparisons are required in the reduction, (e.g., the user's contact does not have to be strictly categorized as a horizontal, vertical or diagonal movement). Furthermore, an additional benefit is that desirable scrolling may be achieved by applying a scaling function to the relative components of the contact movement.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of an electronic device 102 on which systems and methods for touch sensor navigation may be implemented. Examples of an electronic device 102 include desktop computers, laptop computers, netbooks, e-readers, tablet devices, cellular phones, smart phones, Personal Digital Assistants (PDAs), etc.

The electronic device 102 may include a touch sensor 104, one or more scaling functions 108 and a display 112. The display 112 may present an image 114. The touch sensor 104 may be a sensor that is used to detect contact. For example, the touch sensor 104 may use capacitive, resistive, Surface Acoustic Wave (SAW), strain gauge or other technology to detect contact. As used herein, the term "contact" may denote contact between the touch sensor 104 and some other object. For example, the touch sensor 104 may detect a contact (e.g., the location of one or more contacts) with one or more fingers, styli or other objects. In one configuration, the touch sensor 104 may determine one or more contact positions 106 (e.g., coordinates) for each of the one or more contacts. For example, the touch sensor 104 may provide contact positions 106 (e.g., the horizontal and vertical coordinates of one or more contacts) to the electronic device 102. As used herein, the "horizontal" coordinate may be denoted as an "x" coordinate, and the "vertical" coordinate may be denoted as a "y" coordinate. For instance, the touch sensor 104 may provide x and y coordinates of one or more contacts.

Examples of the touch sensor 104 include a touchscreen and a touchpad. In one configuration, the touch sensor 104 may be combined or integrated with the display 112 to form a touchscreen. For instance, the display 112 may display interactive images 114 (e.g., icons, windows, controls such as buttons, sliders, dials, pictures, etc.) that a user may interact with by touching the touchscreen that includes the display 112 and the touch sensor 104. In another configuration, the touch sensor 104 is not integrated with the display 112. For example, the touch sensor 104 may be a touchpad that is independent of the display 112. However, a user may touch the touch sensor 104 (e.g., touchpad) in order to control a cursor that is displayed on the display 112. A user may thus use the touch sensor 104 to interact with the electronic device 102.

The display 112 may be an output device for presentation of information to the user. For example, the display 112 may use cathode ray tube (CRT), light-emitting diode (LED), liquid crystal display (LCD), electronic paper (E Ink) or other technology to present information. Furthermore, the display 112 may include one or more of software and hardware components that render the image 114. For instance, the display 112 may include one or more of display driver software and a display controller in some implementations.

In some cases, the image 114 may extend beyond the viewable area of the display 112. For example, the image 114 may be a web page, word processing document, digital photograph or other electronic file. Because the image 114 may extend beyond the viewable area of the display 112, the electronic device 102 may navigate to different locations of the image 114.

The electronic device 102 may navigate to different locations of the image 114 based on one or more contact positions 106 provided by the touch sensor 104. For example, the touch sensor 104 detects and provides one or more contact positions 106 of one or more detected contacts. In one configuration, when a contact is moved along the touch sensor 104, the contact position 106 on the touch sensor 104 may be reported regularly by a software-based touch sensor driver as a set of coordinates. In another example configuration, the touch sensor 104 may include hardware (e.g., circuitry) that provides the contact position 106 as a set of coordinates.

The contact position 106 may be provided to one or more scaling functions 108, which may determine a modified position 110 for the image 114 based on the contact position 106. In one configuration, the scaling function 108 may be implemented as a software module stored in the memory that is executed by a processor on the electronic device 102. In another configuration, the scaling function 108 may be implemented in hardware (e.g., circuitry). The scaling function 108 may use the contact position 106 reported by the touch sensor 104 as the basis for the modified position 110 used to navigate the image 114. For example, the electronic device 102 may obtain a series of contact positions 106 corresponding to contact movements. For instance, a contact movement may correspond to a first position 106 detected and an updated position 106. Using these contact positions 106, the scaling function 108 may determine a modified position 110. The modified position 110 may represent a scaled version (in one or more directions or axes) of the contact movement. Examples of how the scaling function 108 may determine a modified position 110 may include using a continuous function, a step function, an algorithm or a lookup table. Further details of the scaling function 108 will be discussed in the Figures below.

The modified position 110 may be provided to the display 112 (e.g., to one or more of a processor, display driver, display controller, etc.). The display 112 may adjust the image 114 position (e.g., viewable area of the image 114) based on the modified position 110. For example, the display 112 may adjust the vertical and horizontal distance that the image 114 is moved on the display 112.

The image 114 may be moved on the display 112 based on the modified position 110. As described above, the electronic device 102 may include software drivers (e.g., video or display drivers) and video hardware that control the display 112 and may interface with the touch sensor 104. In one configuration, the image 114 may be stored in the memory (e.g., RAM) of the electronic device 102. The electronic device 102 may have a processor that may receive and interpret the modified position 110 and render the image 114 accordingly. For example, the area of the image 114 that is viewable on the display 112 may be adjusted based on the modified position 110 produced by the scaling function 108 in response to a user interaction with the touch sensor 104. Therefore, as used herein, the term "move" may denote rendering different viewable areas of the image 114 on the display 112. Furthermore, in one configuration, the viewable area of the display 112 that may be used to present the image 114 may extend to fill the entire display 112. In another configuration, the viewable area of the display 112 that may be used to present the image 114 may be a portion of the display 112. For example, the viewable area of the display 112 may be a window within a graphical user interface (GUI) of the electronic device 102.

It should be noted that one or more of the elements or parts thereof included in the electronic device 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
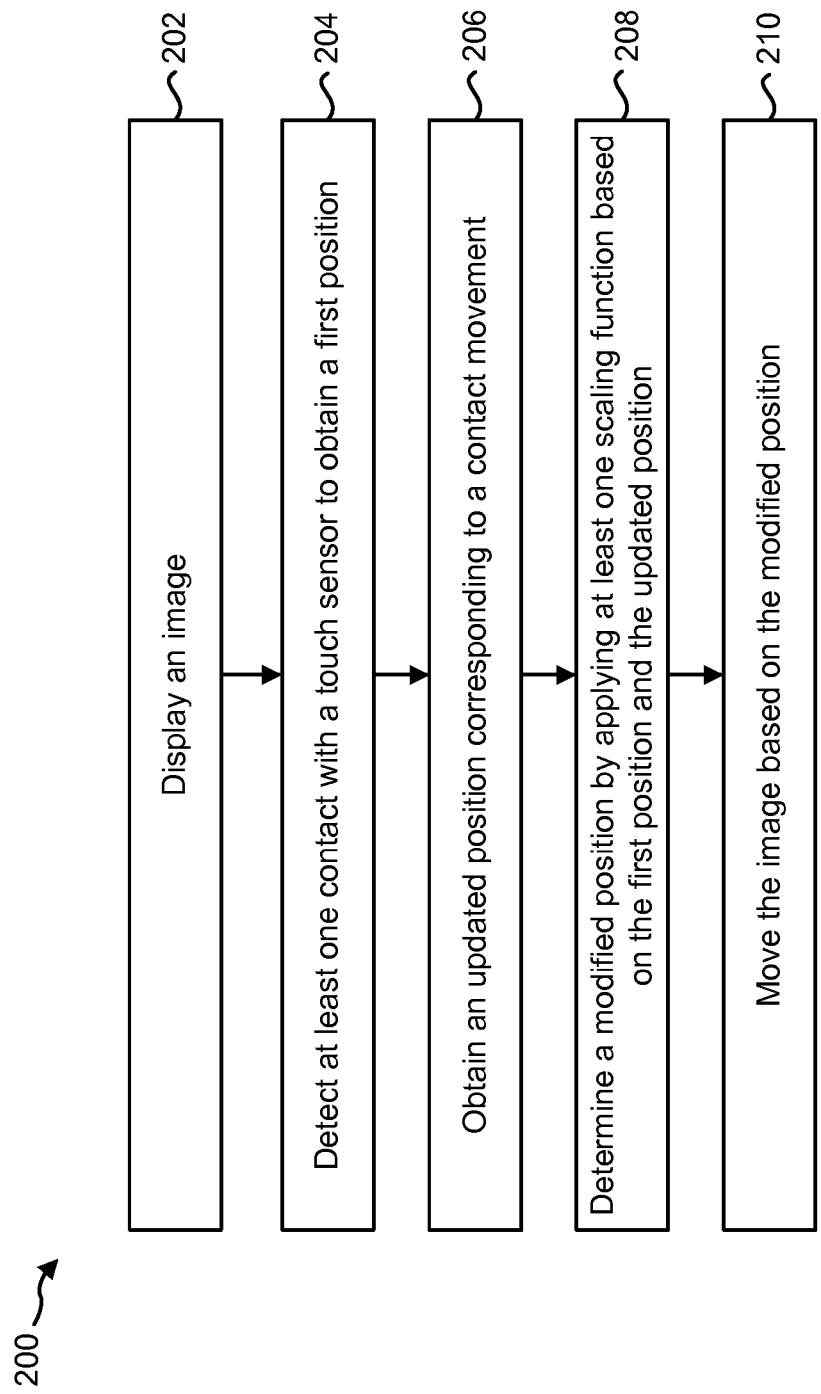
FIG. 2 is a flow diagram illustrating one configuration of a method for touch sensor navigation.

FIG. 2 is a flow diagram illustrating one configuration of a method 200 for touch sensor navigation. An electronic device 102 may display 202 an image 114 on a display 112. For example, the image 114 may be a web page with multiple lines of text that extend beyond the viewable area of the display 112. For instance, this may require navigation to different image 114 positions in order to display all of the text. In another example, the image 114 may be a digital photograph that may extend beyond the viewable area of the display 112.

The electronic device 102 may detect 204 at least one contact with a touch sensor 104 to obtain a first position 106. For example, the first position 106 may represent a location that a user's finger first contacts the touch sensor 104. In one configuration, this first position 106 may represent the starting position of a scrolling movement within the image 114. The contact position 106 may be expressed as Cartesian x and y coordinates. In another configuration, the contact position 106 may be expressed as polar coordinates (e.g., angle and radius).

The electronic device 102 may obtain 206 an updated position 106 corresponding to a contact movement. The updated position 106 may represent the contact location on the touch sensor 104 during or after a contact movement from the first position 106. For example, a swipe motion using a finger in contact with the touch sensor 104 may result in an updated position 106 relative to the first position 106.

The electronic device 102 may determine 208 a modified position by applying at least one scaling function 108 based on the first position 106 and the updated position 106. These contact positions 106 may be provided by the touch sensor 104. In one example, the scaling function 108 may scale down the horizontal distance more than the vertical distance of the contact movement if the contact movement is more vertical than horizontal. Additionally or alternatively, the scaling function 108 may scale down the vertical distance more than the horizontal distance of the contact movement if the contact movement is more horizontal than vertical. In another example, only the direction of lesser contact movement may be scaled down while the direction of greater contact movement may be maintained. The scaled version of the contact movement may be represented by the modified position 110.

The electronic device 102 may move 210 the image 114 on the display 112 based on the modified position 110. For example, the electronic device 102 may store the image 114 in memory. Then, upon determining 208 the modified position 110, the electronic device 102 may render a new viewable area of the image 114 on the display 112 based on the modified position 110. In accordance with the above example, if a contact movement is more vertical than horizontal, the horizontal distance that the image 114 is moved 210 may be scaled down to a greater degree than the vertical distance. Similarly, if a contact movement is more horizontal than vertical, the vertical distance that the image 114 is moved 210 may be scaled down to a greater degree than the horizontal distance. In an alternative example, the image 114 may be moved 210 to the full extent of the contact movement in the direction of greater contact movement and to a scaled down extent in the direction of lesser contact movement.

In some configurations, the electronic device 102 may move 210 the image 114 in the direction of the modified position 110 or in the opposite direction of the modified position 110. For instance, if the modified position 110 is downward, the image 114 position is moved 210 downward (e.g., the viewable area of the image 114 is upward). This may be similar to a "drag" operation. In another configuration, the electronic device 102 moves 210 the image 114 in the opposite direction of the modified position 110. For instance, if the modified position 110 is downward, the image 114 position is moved 210 upward (e.g., the viewable area of the image 114 is downward). This may be similar to a "scroll" operation.

Figure 3:
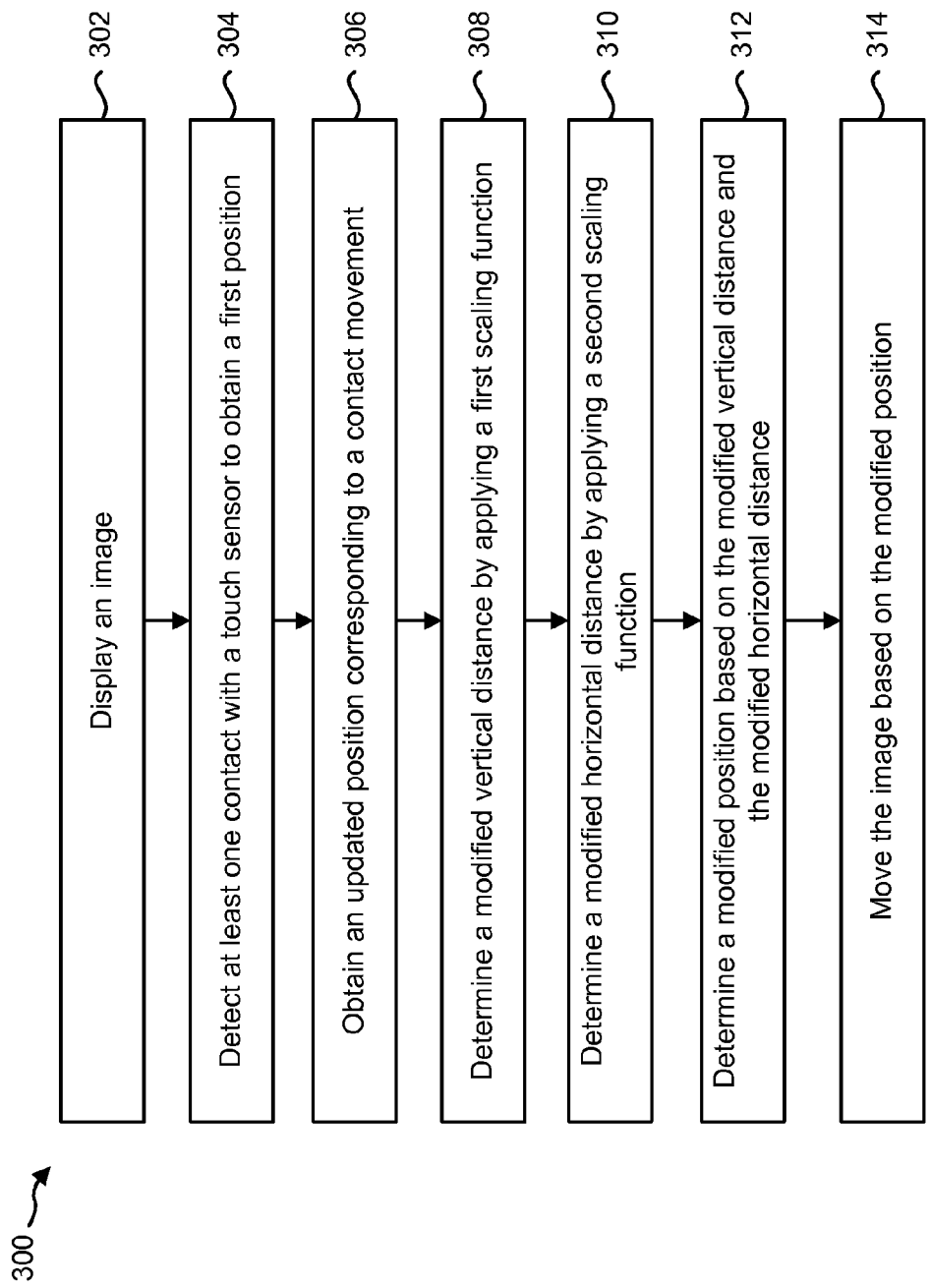
FIG. 3 is a flow diagram illustrating a more specific configuration of a method for touch sensor navigation.

FIG. 3 is a flow diagram illustrating a more specific configuration of a method 300 for touch sensor navigation. An electronic device 102 may display 302 an image 114 on a display 112. For example, this may be accomplished as described above in FIG. 2.

The electronic device 102 may detect 304 at least one contact with a touch sensor 104 to obtain a first position 106. This may be accomplished as described above in FIG. 2.

The electronic device 102 may obtain 306 an updated position 106 corresponding to a contact movement. This may be accomplished as described above in of FIG. 2.

The electronic device 102 may determine 308 a modified vertical distance by applying a first scaling function. For example, the electronic device 102 may apply the first scaling function based on the difference between the first position 106 and the updated position 106. The first scaling function may determine 308 a modified vertical distance that may correspond to a scaled version of the vertical component of the contact movement. For example, the first scaling function may determine a scaling factor that may be used to modify the vertical component of the contact movement.

The electronic device 102 may determine 310 a modified horizontal distance by applying a second scaling function. As described above, the electronic device 102 may apply the second scaling function based on the difference between the first position 106 and the updated position 106. The second scaling function may determine 310 a modified horizontal distance that may correspond to a scaled version of the horizontal component of the contact movement.

The electronic device 102 may determine 312 a modified position 110 based on the modified vertical distance and the modified horizontal distance. In one configuration, the modified position 110 may be based on a combination of the modified vertical distance and the modified horizontal distance. For example, the electronic device 102 may store the modified distance 110 as a set of x and y coordinates that may represent a scaled version of the contact movement. In another configuration, the modified position may be based on the inverse of the modified vertical distance and the modified horizontal distance.

The electronic device 102 may move 314 the image 114 based on the modified position 110. For example, this may be accomplished as described above in FIG. 2. In one configuration, the electronic device 102 may move 314 the image 114 to a set of coordinates that may be represented by the modified position 110. In another configuration, the electronic device 102 may move 314 the image 114 based on the modified position 110, but the electronic device 102 may perform additional operations when determining the final location of the image 114. For example, in a "scroll" operation, where the image 114 position is moved 314 opposite the contact movement, the electronic device 102 may invert the modified position 110 before moving 314 the image 114.

Figure 4:
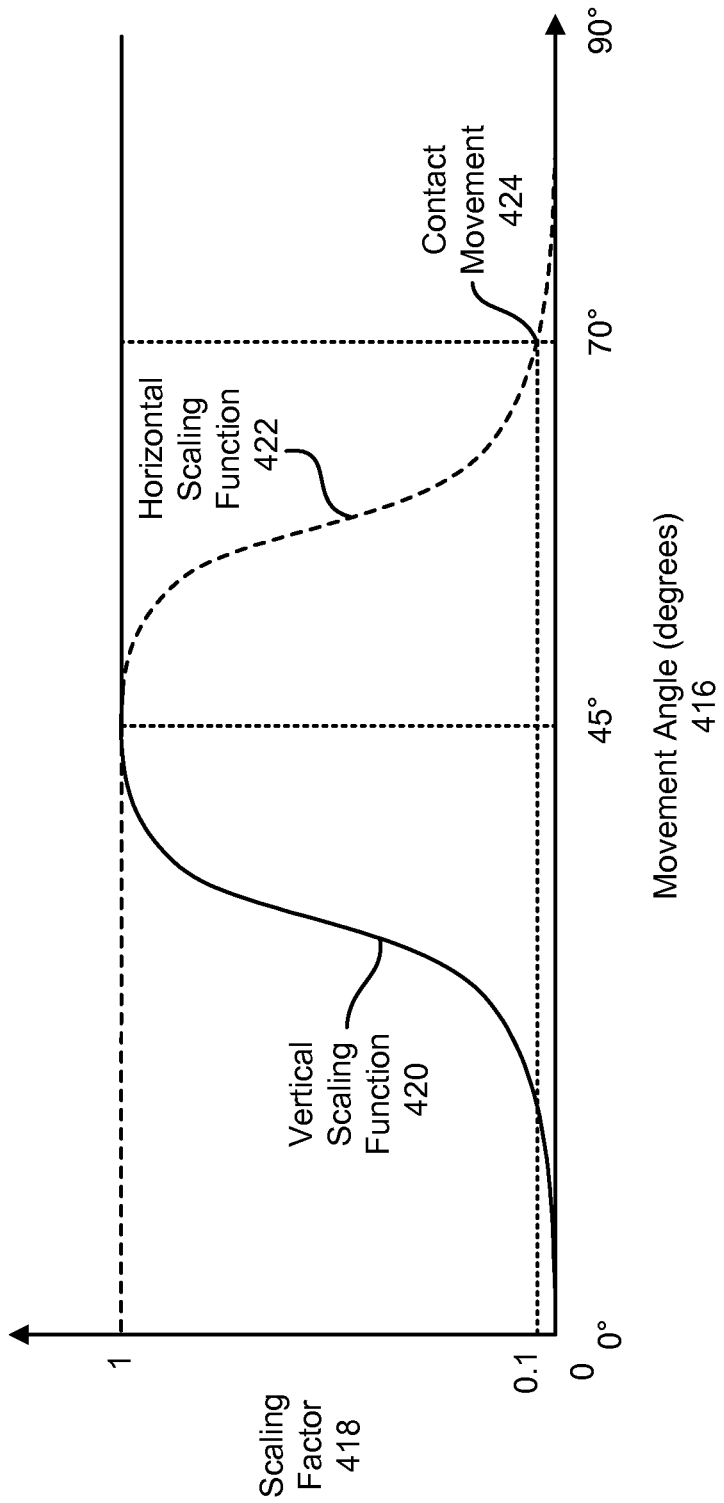
FIG. 4 is a graph illustrating scaling factors provided by examples of scaling functions.

FIG. 4 is a graph illustrating scaling factors 418 provided by examples of scaling functions 108. The graph depicts the scaling factors 418 that scaling functions 108 may produce for a given movement angle 416. In this example, the movement angle is illustrated between 0 and 90 degrees, where 0 degrees represents a horizontal contact movement to the right and 90 degrees represents an upward vertical contact movement. In other words, the portions of the scaling functions 420, 422 illustrated in FIG. 4 may be applied to contact movement towards the top or towards the right of a touch sensor 104 or any direction in between. However, it will be appreciated that the scaling functions 108 may be applied to a contact movement in any direction. For example, the portions of the scaling functions 420, 422 illustrated in FIG. 4 may be similarly applied to other angles (e.g., quadrants) of contact movement.

The scaling factor 418 produced by the scaling functions 420, 422 in this example may have any value between 0 and 1. However, it will be appreciated that the scaling factor may have any value, including positive and negative values. The vertical scaling function 420 is depicted as a solid line in FIG. 4. The horizontal scaling function 422 is depicted as a dashed line in FIG. 4. In this example, the horizontal scaling function 422 is a shifted inverse of the vertical scaling function 420.

For the vertical scaling function 420 illustrated in FIG. 4, the scaling factor 418 is 0 when the movement angle 416 is 0 degrees (e.g., the contact movement 424 is horizontal). As the movement angle 416 increases, the scaling factor 418 for the vertical component 420 increases. The scaling factor 418 of the vertical scaling function 420 increases until the movement angle 416 reaches 45 degrees, at which point the scaling factor 418 is 1. At 45 degrees, the scaling factors 418 of the vertical scaling function 420 and the horizontal scaling function 422 are equal at 1. As the movement angle 416 increases from 45 degrees to 90 degrees, the contact movement 424 is primarily vertical and the scaling factor 418 for the vertical component 420 is 1 for this range of movement angles 416.

As mentioned above, the horizontal scaling function 422 in this example is a shifted inverse of the vertical scaling function 420. Starting at a movement angle 416 of 0 degrees, the scaling factor 418 for the horizontal component 422 is 1. In this example, while the contact movement 424 is primarily horizontal (e.g., between a movement angle 416 of 0 to 45 degrees) the scaling factor 418 for the horizontal scaling function 422 is 1. As the movement angle 416 increases from 45 to 90 degrees, the scaling factor 418 for the horizontal scaling function 422 decreases to 0.

A specific example of contact movement 424 at 70 degrees is depicted in the graph. At a movement angle 416 of 70 degrees, the scaling factor 418 for the vertical scaling function 420 is 1 and the scaling factor 418 for the horizontal scaling function 422 is 0.1. In this example, when the movement angle 416 is 70 degrees, the contact movement 424 is primarily vertical. The scaling function 108 reduces the horizontal distance of the contact movement 424 (e.g., the horizontal distance is multiplied by 0.1), while the vertical distance remains unchanged (e.g., the vertical distance is multiplied by 1).

After determining one or more scaling factors 418, the electronic device 102 may use the scaling factors 418 to determine the modified position 110. For example, to determine a modified vertical distance, a vertical distance of the contact movement 424 may be multiplied by the scaling factor 418 of the vertical scaling function 420. This example illustrates how using a scaling function 108 may more accurately represent the user's intent during touch sensor navigation.

Examples of the scaling functions 420, 422 illustrated in FIG. 4 may be given as described in Equation (1) and Equation (2) below. Equation (1) illustrates one example of a vertical scaling function (in the range of 0 to $$\frac{\Pi}{2}$$

radians of contact movement).

$$S_v = \frac{1}{1+32^{(2.7-6\theta)}} \text{ for } 0 \le \theta < \frac{\Pi}{2} \quad (1)$$

In Equation (1), $S_v$ is a vertical scaling factor and $\theta$ is a movement angle (in radians). The scaling function in Equation (1) is based on a movement angle that is represented in radians. However, it will be appreciated that the movement angle may be represented in any unit of measure (e.g., degrees or radians) and the scaling function may be adapted accordingly. Equation (2) illustrates one example of a horizontal scaling function (in the range of 0 to $$\frac{\Pi}{2}$$

radians of contact movement).

$$S_h = \frac{1}{1+32^{(6\theta-6.7)}} \text{ for } 0 \le \theta < \frac{\Pi}{2} \quad (2)$$

In Equation (2), $S_h$ is a horizontal scaling factor and $\theta$ is a movement angle (in radians).

Other examples (in the range of 0 to 90 degrees of contact movement) of the scaling functions may be given as described in Equation (3) and Equation (4) below. Equation (3) illustrates one example of a vertical scaling function (in the range of 0 to 90 degrees of contact movement).

$$S_v = \begin{cases} \frac{\theta}{45°} & \text{for } 0° \le \theta < 45° \\ 1 & \text{for } 45° \le \theta \le 90° \end{cases} \quad (3)$$

In Equation (3), $S_v$ is a vertical scaling factor and $\theta$ is a movement angle (in degrees). Equation (4) illustrates one example of a horizontal scaling function (in the range of 0 to 90 degrees of contact movement).

$$S_h = \begin{cases} 1 & \text{for } 0° \le \theta < 45° \\ \frac{90°-\theta}{45°} & \text{for } 45° \le \theta \le 90° \end{cases} \quad (4)$$

In Equation (4), $S_h$ is a horizontal scaling factor and $\theta$ is a movement angle (in degrees).

In yet another example, the scaling function 108 may be a single three-dimensional function. For example, instead of utilizing two separate two-dimensional scaling functions to determine the vertical and horizontal scaling factors, as described above in FIG. 4, the scaling function 108 may utilize a single three-dimensional function. For instance, the dimensions of the scaling function 108 may include the movement angle, the vertical scaling factor and the horizontal scaling factor. For example, the single three-dimensional scaling function 108 may determine both the vertical scaling factor and the horizontal scaling factor simultaneously based on a movement angle. In one configuration, the scaling function 108 may be implemented as a lookup table that is stored in the memory of the electronic device 102. The lookup table may include an array of ordered pairs that correspond to the vertical and horizontal scaling factors for a given movement angle. In another configuration, the scaling function 108 may be implemented as a computation of a single function, where the vertical and horizontal scaling factors are calculated based on the movement angle.

Figure 5:
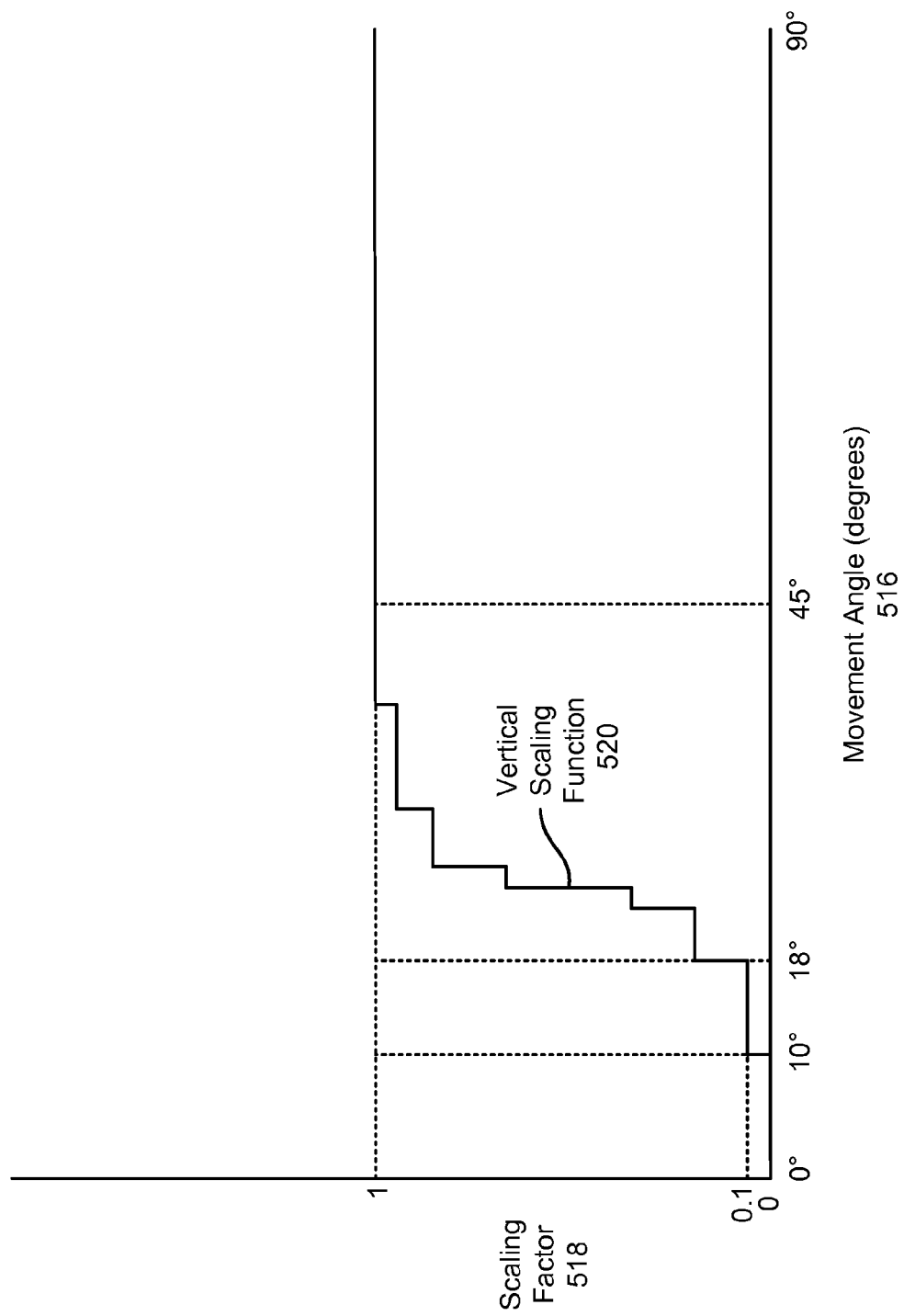
FIG. 5 is a graph illustrating a scaling function based on a step function.

FIG. 5 is a graph illustrating another example of a scaling function 108 based on a step function. In this configuration, the scaling function 108 is based on a step function that may have discrete scaling factor 518 values for a range of movement angles 516. For brevity, only the vertical scaling function 520 of a contact movement is depicted. In this example, the step scaling function 108 results in eight discrete values of the scaling factor 518 for the movement angles 516 ranging from 0 to 90 degrees. For example, for the movement angles 516 between 0 and 10 degrees the scaling factor 518 is 0. For the movement angles 516 between 10 and 18 degrees the scaling factor 518 is 0.1. In another example, scaling functions may include steps at regular intervals (e.g., every 10 degrees) of the movement angle.

It should be noted that one or more scaling functions 108 (e.g., scaling functions 420, 422, 520) may be implemented as one or more lookup tables in some configurations. For example, the electronic device 102 may include an array of scaling factors 518 that are stored in memory and correspond to ranges of movement angles 516. One benefit of this approach is that it may reduce the electronic device's 102 processing time, because the value of the scaling factor 518 is retrieved from memory rather than determined from a computation operation.

Figure 6:
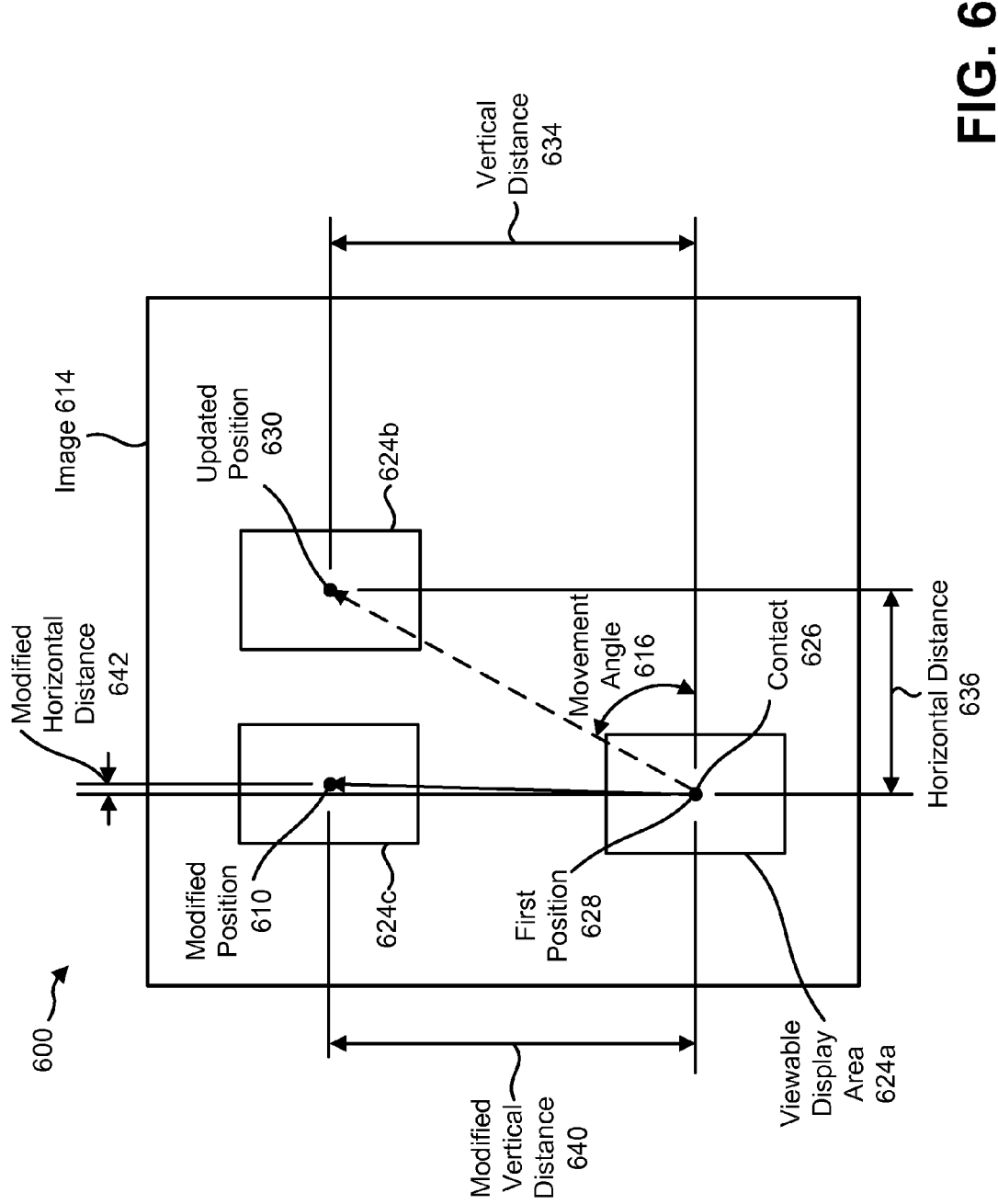
FIG. 6 illustrates one example of scaled movement for touch sensor navigation.

FIG. 6 illustrates one example of scaled image movement 600 for touch sensor navigation. In this example, the image 614 extends beyond the viewable display area 624a. The electronic device 102 may detect a contact 626 on the touch sensor 104 in order to obtain a first position 628. The electronic device 102 may then detect a contact movement to an updated position 630. The vertical distance 634 and the horizontal distance 636 may represent the actual distance of the contact movement along the x and y axes. However, by applying one or more scaling functions 108 based on the first position 628 and updated position 630 may result in a modified vertical distance 640 and a modified horizontal distance 642. The modified position 610 may be based on the modified vertical distance 640 and the modified horizontal distance 642. For example, instead of moving the viewable display area 624*b* to the updated position 630 (or strictly along the y axis in this case, for instance), the viewable display area 624*c* is moved to the modified position 610.

In a specific implementation of the scaled image movement 600, assume the same scaling functions 108 and movement angle 616 (e.g., 70 degrees) from FIG. 4. In this example, the contact movement is primarily vertical. As described in FIG. 4, the scaling function 108 for this configuration reduces the horizontal distance 636 substantially, while maintaining the vertical distance 634. In this example, the vertical distance 634 and the modified vertical distance 640 are equivalent, while the modified horizontal distance 642 is 10% of the horizontal distance 636.

Figure 7:
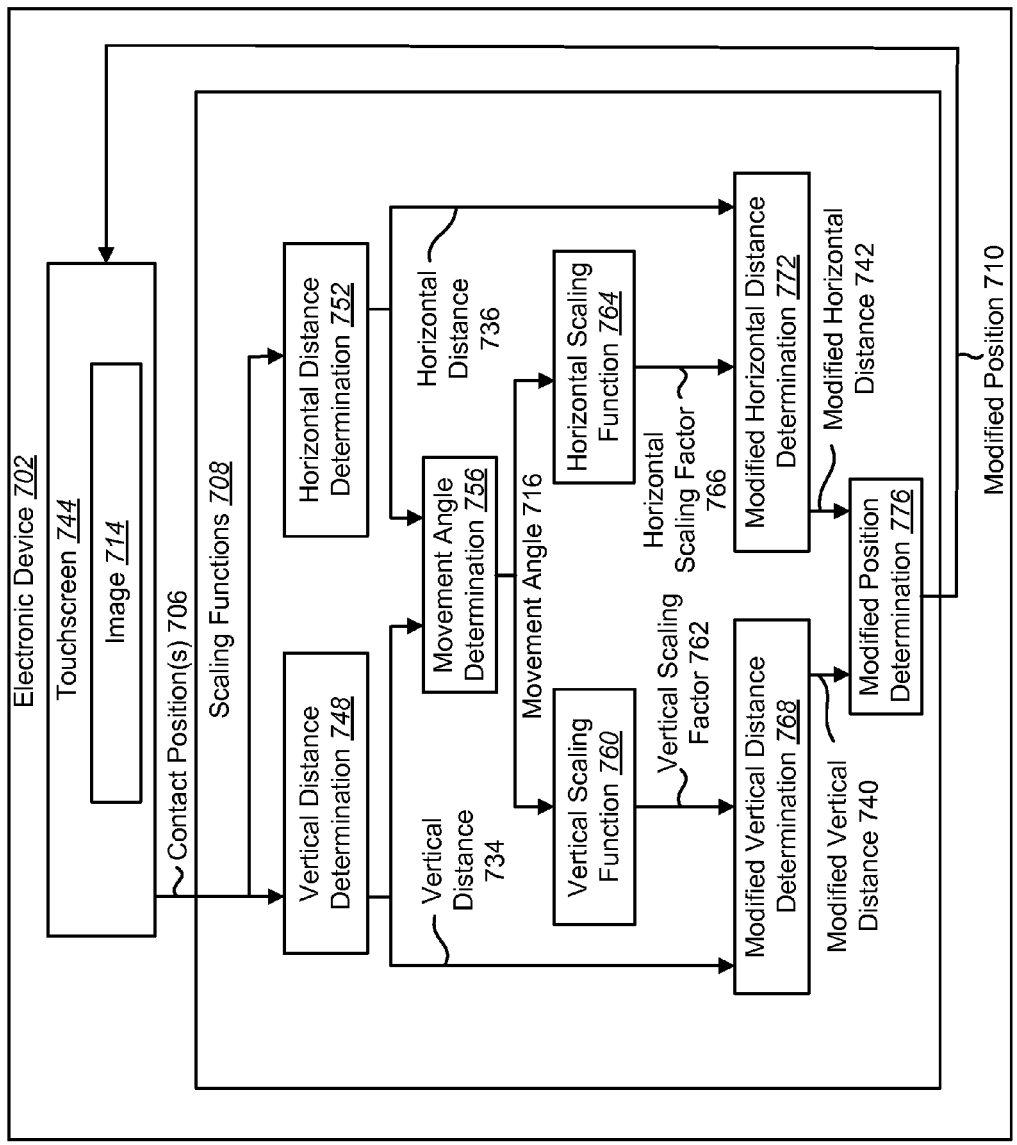
FIG. 7 is a block diagram illustrating a specific example of a configuration of an electronic device in which systems and methods for touch sensor navigation may be implemented.

FIG. 7 is a block diagram illustrating a specific example of a configuration of an electronic device 702 in which systems and methods for touch sensor navigation may be implemented. In this configuration, the electronic device 702 may include a touchscreen 744 and scaling functions 708. The touchscreen 744 may display an image 714. The touchscreen 744 may combine and integrate a display 112 and a touch sensor 104. As described above, the image 714 may extend beyond the viewable area of the touchscreen 744, and may require navigation to different image 714 positions in order to display additional portions of the image. The touchscreen 744 may detect at least one contact. The touchscreen 744 may provide the contact positions 706 to the scaling function 708 in order to determine a modified position 710 for moving the image 714.

The scaling function 708 may contain a vertical distance determination 748. The vertical distance determination 748 may determine the vertical distance 734 between contact positions 706 provided by the touchscreen 744. For example, the touchscreen 744 may provide a first contact position 706 and an updated contact position 706. The vertical distance determination 748 may determine the vertical distance 734 based on the difference between these contact positions 706.

The scaling function 708 may contain a horizontal distance determination 752. The horizontal distance determination 752 may determine the horizontal distance 736 between contact positions 706 provided by the touchscreen 744. As described above, the touchscreen 744 may provide a first position 706 and an updated position 706. The horizontal distance determination 752 may determine the horizontal distance 736 based on the difference between the contact positions 706.

The scaling function 708 may contain a movement angle determination 756. The movement angle determination 756 may determine the movement angle 716 based on the vertical distance 734 and the horizontal distance 736. For example, the movement angle may be determined based on the Equation 5:

$$\theta = \arctan\left(\frac{V}{H}\right) \quad (5)$$

where θ is the movement angle 716, V is the vertical distance 734 and H is the horizontal distance 736.

A vertical scaling function 760 may determine a vertical scaling factor 762. The vertical scaling factor 762 may be based on the movement angle 716. For example, the vertical scaling function 760 may be implemented as described in connection with FIG. 4.

A horizontal scaling function 764 may determine a horizontal scaling factor 766. The horizontal scaling factor 766 may be based on the movement angle 716. For example, the horizontal scaling function 764 may be implemented as described in FIG. 4.

A modified vertical distance determination 768 may determine a modified vertical distance 740. The modified vertical distance 740 may be based on the vertical distance 734 and the vertical scaling factor 762. For example, the modified vertical distance 740 may be the product of the vertical distance 734 and the vertical scaling factor 762 (e.g., the vertical distance 734 may be multiplied by the vertical scaling factor 762).

A modified horizontal distance determination 772 may determine a modified horizontal distance 742. The modified horizontal distance 742 may be based on the horizontal distance 736 and the horizontal scaling factor 766. For example, the modified horizontal distance 742 may be the product of the horizontal distance 736 and the horizontal scaling factor 766 (e.g., the horizontal distance 736 may be multiplied by the horizontal scaling factor 766).

A modified position determination 776 may determine a modified position 710. The modified position 710 may be based on the modified vertical distance 740 and the modified horizontal distance 742. In one configuration, the modified position 710 may be based on a combination of the modified vertical distance 740 and the modified horizontal distance 742. For example, the electronic device 702 may store the modified distance 710 as a set of x and y coordinates that may represent a scaled version of the contact movement. In another configuration, the modified position 710 may be based on the inverse of the modified vertical distance 740 and the modified horizontal distance 742.

The electronic device 702 may move the image 714 on the touchscreen 744 based on the modified position 710. For example, the touchscreen 744 may adjust the x and y coordinates that the image 714 is moved on the touchscreen 744.

In some configurations, the electronic device 702 may determine one or more subsequent modified positions 710 based on one or more subsequent contact movements during continuous contact with the touchscreen 744. For example, the contact movement may be a swipe motion using a finger in contact with the touchscreen 744. Furthermore, the contact movement may be in multiple directions. As the contact position 706 may change, the electronic device 702 may determine a subsequent modified position 710. The electronic device 702 may then move the image 714 based on the subsequent modified position 710 and continue to determine subsequent modified positions 710.

Figure 8:
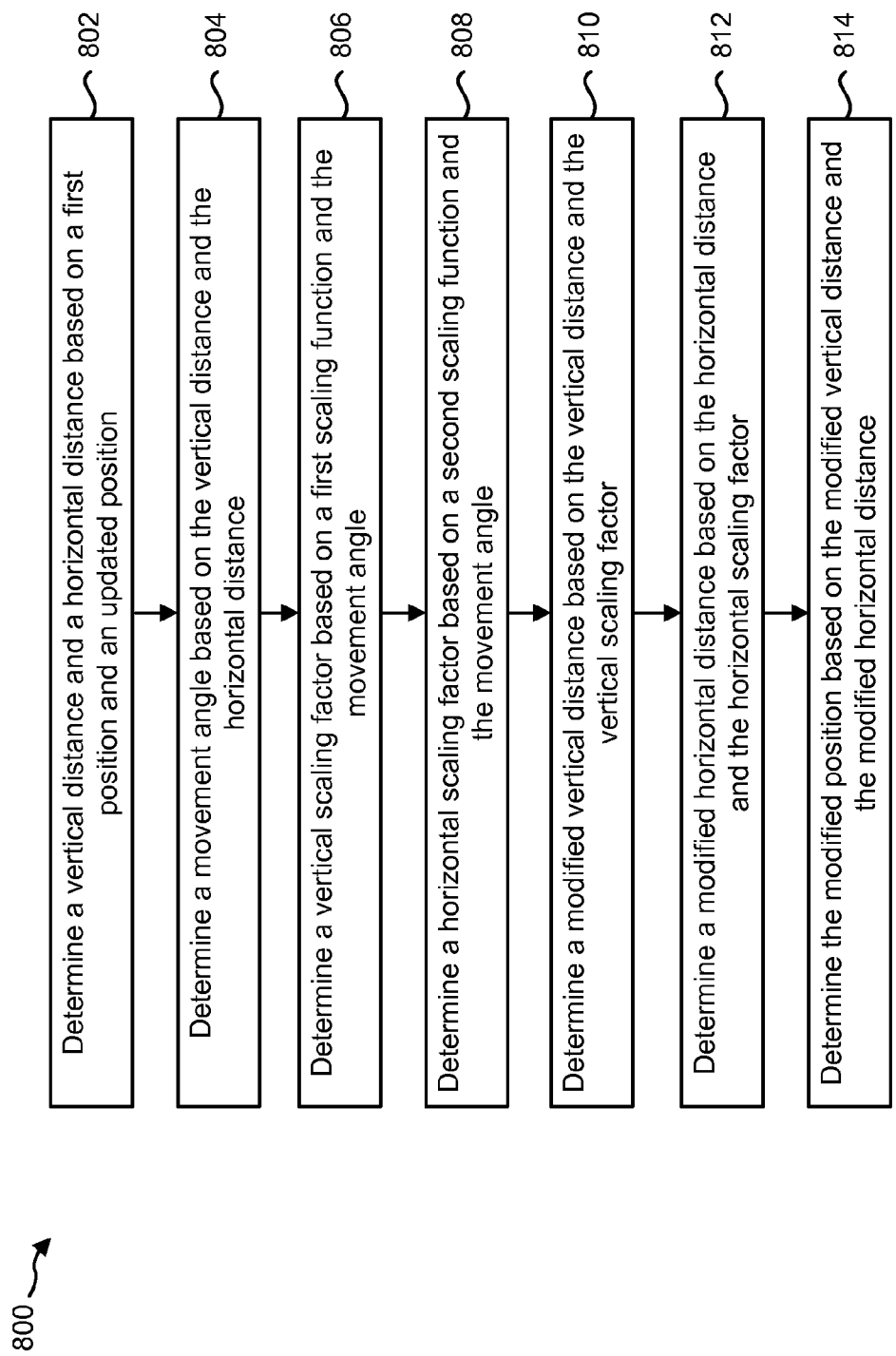
FIG. 8 is a flow diagram illustrating a more specific configuration of a method for determining a modified position.

FIG. 8 is a flow diagram illustrating a more specific configuration of a method 800 for determining a modified position 710. This flow diagram will be explained with respect to FIG. 7 in which the electronic device 702 may have a touchscreen 744. However, it will be appreciated that this same method may be employed by an electronic device 102 that may have a separate touch sensor 104 and a display 112.

The electronic device 702 may determine 802 a vertical distance 734 and a horizontal distance 736 based on a first position 706 and an updated position 706 provided by the touchscreen 744. The vertical distance 734 and the horizontal distance 736 may be based on the difference between the first position 706 and an updated position 706. For instance, the vertical distance 734 may be determined by subtracting the y-coordinate of the first position 706 from the y-coordinate of the updated position 706.

The electronic device 702 may determine 804 a movement angle 716 based on the vertical distance 734 and the horizontal distance 736. For example, the movement angle 716 may be determined 804 based on Equation (5) described above.

The electronic device 702 may determine 806 a vertical scaling factor 762 based on a first scaling function 760 and the movement angle 716. As described above, examples the scaling function 760 may include a continuous function, a step function or an algorithm. In some configurations, the scaling function may be implemented as one or more lookup tables.

The electronic device 702 may determine 808 a horizontal scaling factor 764 based on a second scaling function 764 and the movement angle 716. As described above, the second scaling function 764 may be a shifted inverse of the first scaling function 760.

The electronic device 702 may determine 810 a modified vertical distance 740 based on the vertical distance 734 and the vertical scaling factor 762. As described above in FIG. 7, the modified vertical distance 740 may be determined 810 by multiplying the vertical distance 734 and the vertical scaling factor 762.

The electronic device 702 may determine 812 a modified horizontal distance 742 based on the horizontal distance 736 and the horizontal scaling factor 766. As described above in FIG. 7, the modified horizontal distance 742 may be determined 812 by multiplying the horizontal distance 736 and the horizontal scaling factor 766.

The electronic device 702 may determine 814 the modified position 710 based on the modified vertical distance 740 and the modified horizontal distance 742. For example, the electronic device 702 may combine the modified vertical distance 740 and the modified horizontal distance 742 to obtain x and y coordinates. Alternatively, the electronic device 702 may base the modified position 710 on an inverse of the modified vertical distance 740 and the modified horizontal distance 742.

Figure 9:
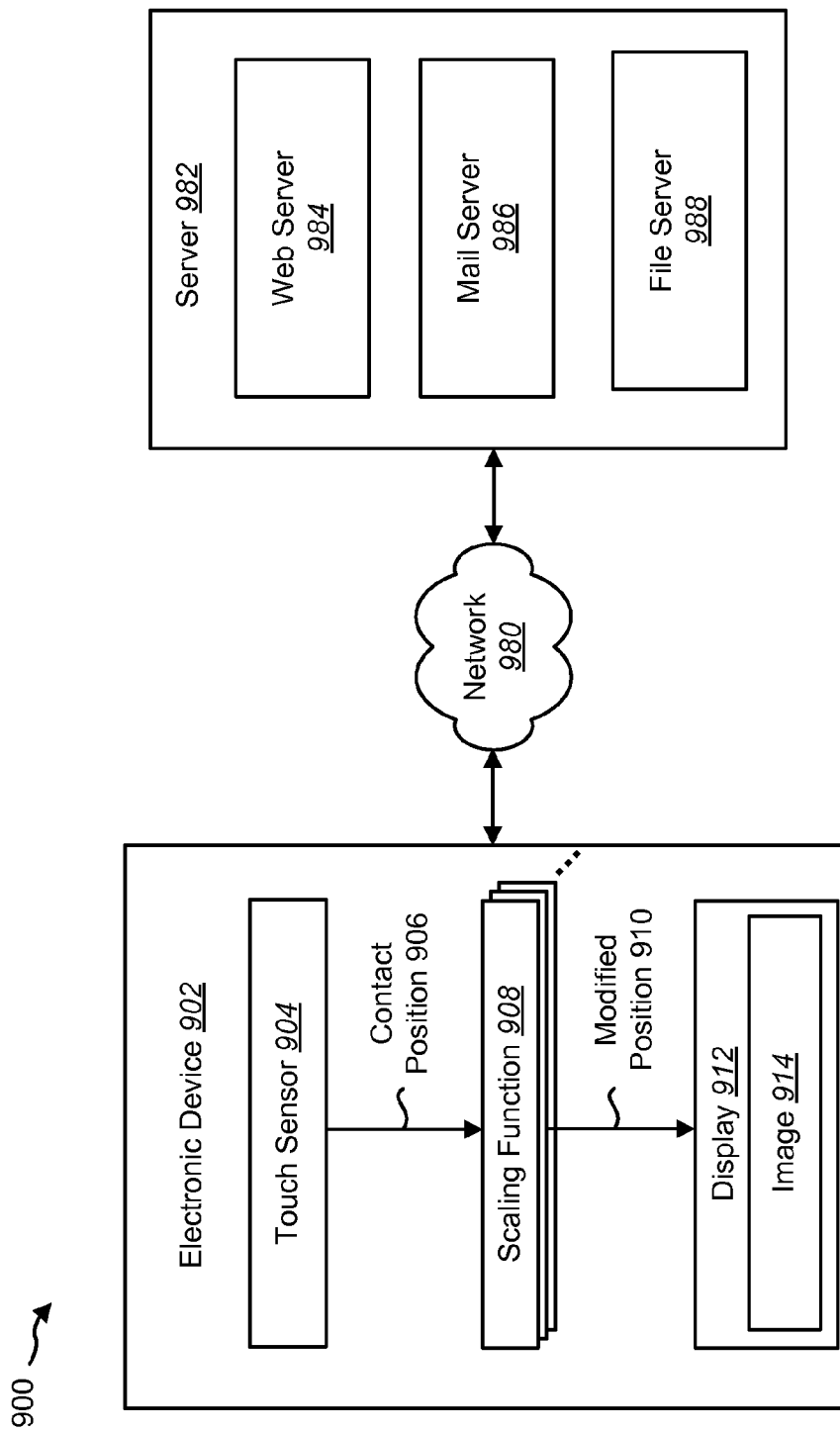
FIG. 9 is a block diagram illustrating a network in which a configuration of a system for touch sensor navigation within a network group may be implemented.

FIG. 9 is a block diagram illustrating a network 980 in which a configuration of a system 900 for touch sensor navigation within a network group may be implemented. An electronic device 902 may connect to a network 980 such that the electronic device 902 may share resources and information with other hardware components and computers. Examples of the network 980 include computer networks such as a Local Computer Network (LAN), a Wide Area Network (WAN) and the Internet. The network 980 may also include telephone networks including wired fixed line networks such as the Public Switched Telephone Network (PSTN) and wireless cellular networks such as Universal Mobile Telecommunications System (UMTS) and 3GPP Long Term Evolution (LTE). The electronic device 902 may connect to the network 980 using a wired (e.g., Ethernet) or wireless (e.g., Wi-Fi or LTE) connection.

The electronic device 902 may communicate with a server 982 that is connected to the network 980. The server 982 may include various types of servers, including a web server 984 (e.g., Apache), a mail server 986 (e.g., Microsoft Exchange Server), a file server 988 (e.g., FTP) and so forth. The electronic device 902 may send information to and receive information from the server 982. For example, the electronic device 902 may receive an image 914 file from the web server 984 that the electronic device 902 may then display on a display 912. The electronic device 902 may then move the image 914 based on a modified position 910. The modified position 910 may be determined by applying scaling functions 908 in response to movement of contact positions 906 on a touch sensor 904.

Figure 10:
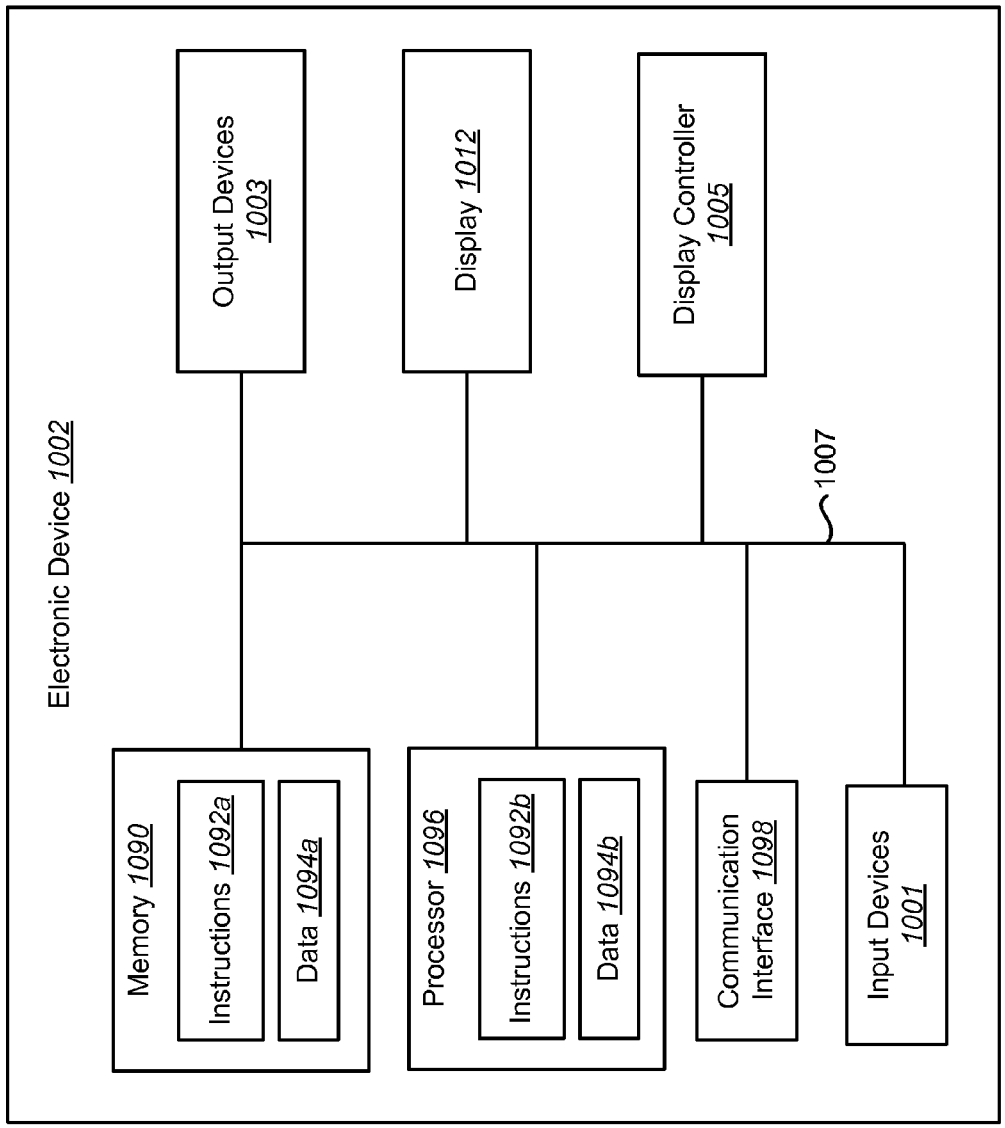
FIG. 10 illustrates various components that may be utilized in an electronic device.

FIG. 10 illustrates various components that may be utilized in an electronic device 1002. One or more of the electronic devices 102, 702, 902 described previously may be implemented in accordance with the electronic device 1002 illustrated in FIG. 10. The electronic device 1002 includes a processor 1096 that controls operation of the electronic device 1002. The processor 1096 may also be referred to as a CPU. Memory 1090, which may include both read-only memory (ROM), random access memory (RAM) or any type of device that may store information, provides instructions 1092a and data 1094a to the processor 1096. A portion of the memory 1090 may also include non-volatile random access memory (NVRAM). Instructions 1092b and data 1094b may also reside in the processor 1096. Instructions 1092b and data 1094b loaded into the processor 1096 may also include instructions 1092a and data 1094a from memory 1090 that were loaded for execution or processing by the processor 1096. The instructions 1092b may be executed by the processor 1096 to implement one or more of the methods 200, 300, 800 described herein.

The electronic device 1002 may include one or more communication interfaces 1098 for communicating with other electronic devices. The communication interfaces 1098 may be based on wired communication technology, wireless communication technology or both. Examples of communication interfaces 1098 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter and so forth.

The electronic device 1002 may include one or more output devices 1003 and one or more input devices 1001. Examples of output devices 1003 include a speaker, printer, etc. One type of output device 1003 that may be included in an electronic device 1002 is a display device 1012. Display devices 1012 used with configurations disclosed herein may utilize any suitable image projection technology, such as a cathode ray tube (CRT), liquid crystal display (LCD), light-emitting diode (LED), electronic paper (e-ink), gas plasma, electroluminescence or the like. A display controller 1005 may be provided for converting data stored in the memory 1090 into text, graphics and moving images (as appropriate) shown on the display 1012. Examples of input devices 1001 include a keyboard, mouse, microphone, remote control device, button, joystick, trackball, touchpad, touchscreen, lightpen, etc.

The various components of the electronic device 1002 are coupled together by a bus system 1007, which may include a power bus, a control signal bus and a status signal bus, in addition to a data bus. However, for the sake of clarity, the various buses are illustrated in FIG. 10 as the bus system 1007. The electronic device 1002 illustrated in FIG. 10 is a functional block diagram rather than a listing of specific components.

Figure 11:
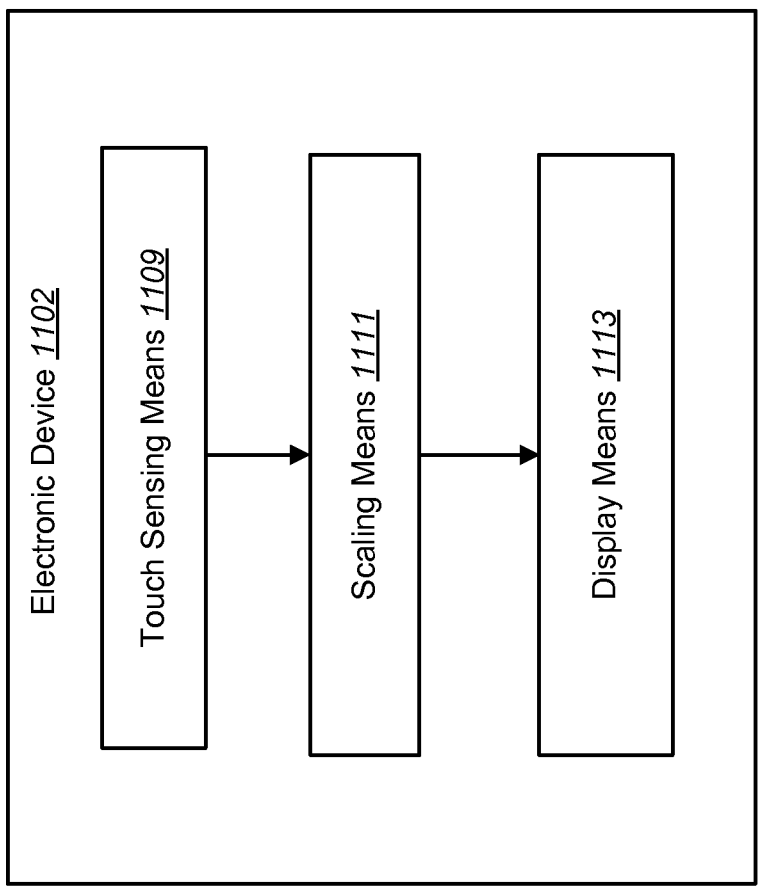
FIG. 11 is a block diagram illustrating another configuration of an electronic device in which systems and methods for touch sensor navigation may be implemented.

FIG. 11 is a block diagram illustrating another configuration of an electronic device 1102 in which systems and methods for touch sensor navigation may be implemented. The electronic device 1102 includes touch sensing means 1109, scaling means 1111 and display means 1113. The touch sensing means 1109, scaling means 1111 and display means 1113 may be configured to perform one or more of the functions described in connection with FIG. 2, FIG. 3, FIG. 8 and FIG. 10 above. FIG. 10 above illustrates one example of a concrete apparatus structure of FIG. 11. Other various structures may be implemented to realize one or more of the functions of FIG. 2 FIG. 3, FIG. 8 and FIG. 10.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

As used herein, the term "based on" does not mean "based only on" unless specifically indicated otherwise. For example, "based on" may mean "based at least on."

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for image navigation on an electronic device comprising:
    displaying an image;
    detecting at least one contact with a touch sensor to obtain a first position;
    obtaining an updated position corresponding to a contact movement;
    determining a modified position by applying at least one scaling function based on the first position and the updated position, wherein the modified position is different than the updated position, wherein determining the modified position comprises:
        determining a modified vertical distance by applying a first scaling function;
        determining a modified horizontal distance by applying a second scaling function; and
        determining the modified position based on the modified vertical distance and the modified horizontal distance; and
    moving the image based on the modified position.

2. The method of claim 1, wherein determining the modified vertical distance and the modified horizontal distance comprises:
    determining a vertical distance and a horizontal distance;
    determining the modified vertical distance by applying the first scaling function based on the vertical distance and the horizontal distance; and
    determining the modified horizontal distance by applying the second scaling function based on the vertical distance and the horizontal distance.

3. The method of claim 1, wherein the second scaling function is a shifted inverse of the first scaling function.

4. The method of claim 1, wherein determining the modified position further comprises:
    determining a vertical distance and a horizontal distance based on the first position and the updated position;
    determining a movement angle based on the vertical distance and the horizontal distance;
    determining a vertical scaling factor based on the first scaling function and the movement angle; and
    determining a horizontal scaling factor based on the second scaling function and the movement angle.

5. The method of claim 1, further comprising determining at least one subsequent modified position based on a subsequent contact movement during continuous contact with the touch sensor.

6. The method of claim 5, wherein the at least one subsequent modified position is not constrained to a single direction.

7. The method of claim 1, wherein the at least one scaling function is at least one of a group consisting of a continuous function, a step function and a lookup table.

8. The method of claim 1, wherein the image is selected from a group consisting of a web page, an electronic document and a digital photograph.

9. The method of claim 1, wherein the touch sensor and a display comprise a touchscreen display.

10. The method of claim 1, wherein the modified position is based on a polar coordinate system or a Cartesian coordinate system.

11. An electronic device that is configured for image navigation, the electronic device comprising:
    a display;
    a touch sensor;
    a processor;
    memory in electronic communication with the processor;
    instructions stored in the memory, the instructions being executable to:
        detect at least one contact with the touch sensor to obtain a first position;
        obtain an updated position corresponding to a contact movement;
        determine a modified position by applying at least one scaling function based on the first position and the updated position, wherein the modified position is different than the updated position, wherein determining the modified position comprises:
            determining a modified vertical distance by applying a first scaling function;
            determining a modified horizontal distance by applying a second scaling function; and
            determining the modified position based on the modified vertical distance and the modified horizontal distance; and
        move the image based on the modified position.

12. The electronic device of claim 11, wherein determining the modified vertical distance and the modified horizontal distance comprises:
    determining a vertical distance and a horizontal distance;
    determining the modified vertical distance by applying the first scaling function based on the vertical distance and the horizontal distance; and
    determining the modified horizontal distance by applying the second scaling function based on the vertical distance and the horizontal distance.

13. The electronic device of claim 11, wherein the second scaling function is a shifted inverse of the first scaling function.

14. The electronic device of claim 11, wherein determining the modified position further comprises:
- determining a vertical distance and a horizontal distance based on the first position and the updated position;
- determining a movement angle based on the vertical distance and the horizontal distance;
- determining a vertical scaling factor based on the first scaling function and the movement angle; and
- determining a horizontal scaling factor based on the second scaling function and the movement angle.

15. The electronic device of claim 11, wherein the instructions are further executable to determine at least one subsequent modified position based on a subsequent contact movement during continuous contact with the touch sensor.

16. The electronic device of claim 15, wherein the at least one subsequent modified position is not constrained to a single direction.

17. The electronic device of claim 11, wherein the at least one scaling function is at least one of a group consisting of a continuous function, a step function and a lookup table.

18. The electronic device of claim 11, wherein the image is selected from a group consisting of a web page, an electronic document and a digital photograph.

19. The electronic device of claim 11, wherein the touch sensor and the display comprise a touchscreen display.

20. The electronic device of claim 11, wherein the modified position is based on a Cartesian coordinate system or a polar coordinate system.

* * * * *